(12) United States Patent
Kim et al.

(10) Patent No.: US 8,007,127 B2
(45) Date of Patent: Aug. 30, 2011

(54) LENS FOR LED OUTDOOR LAMP, AND ITS APPLIED ROAD LAMP, SECURITY LAMP, TUNNEL LAMP, PARK LAMP, GUARD LAMP, INDUSTRIAL FLOOD LAMP, AND OUTDOOR LAMP

(75) Inventors: Sang-ok Kim, Seoul (KR); Byung-oh Kim, Suwon (KR); Min-jin Cho, Suwon (KR)

(73) Assignee: Yuyang D&U Co., Ltd. (KR)

( * ) Notice: Subject to any disclaimer, the term of this patent is extended or adjusted under 35 U.S.C. 154(b) by 287 days.

(21) Appl. No.: 12/321,120

(22) Filed: Jan. 15, 2009

(65) Prior Publication Data
US 2010/0073928 A1 Mar. 25, 2010

(30) Foreign Application Priority Data
Sep. 23, 2008 (KR) ........................ 10-2008-0093336

(51) Int. Cl.
*F21V 5/00* (2006.01)

(52) U.S. Cl. ......... 362/245; 362/240; 362/294; 362/218
(58) Field of Classification Search ................. 362/326, 362/249.02, 310, 31.02, 311.06, 311.09, 362/311.1, 294, 373, 245, 240; 359/837, 359/831, 834
See application file for complete search history.

(56) References Cited

U.S. PATENT DOCUMENTS

| | | | |
|---|---|---|---|
| 6,561,690 B2 * | 5/2003 | Balestriero et al. | 362/555 |
| 7,049,740 B2 * | 5/2006 | Takekuma | 313/501 |
| 7,641,365 B2 * | 1/2010 | Katzir et al. | 362/327 |
| 7,810,951 B1 * | 10/2010 | Lee et al. | 362/249.03 |

* cited by examiner

*Primary Examiner* — Ali Alavi
(74) *Attorney, Agent, or Firm* — Harness, Dickey & Pierce, P.L.C.

(57) ABSTRACT

Disclosed is a lens for an LED outdoor lamp, and a road lamp, a security lamp, a tunnel lamp, a park lamp, a guard lamp, an industrial flood lamp, and an outdoor lamp using the lens. There is an advantage in that the shape of a light field can be a square shape by controlling light distribution. Brightness is very uniform within a available illumination range, and stray light is hardly generated outside of the range.

11 Claims, 15 Drawing Sheets

LENS FOR LED OUTDOOR LAMP, AND ITS APPLIED ROAD LAMP, SECURITY LAMP, TUNNEL LAMP, PARK LAMP, GUARD LAMP, INDUSTRIAL FLOOD LAMP, AND OUTDOOR LAMP

CROSS-REFERENCE TO RELATED APPLICATION

This non-provisional application claims priority under 35 U.S.C §119(a) on Patent Application No. 10-2008-0093336 filed in Korea on Sep. 23, 2008, the entire contents of which are hereby incorporated by reference.

TECHNICAL FIELD

The present invention relates to a lens for Light Emitting Diode (LED) outdoor lamp, and its applied road lamp, security lamp, tunnel lamp, park lamp, guard lamp, industrial flood lamp, and outdoor lamp. More particularly, the present invention relates to a lens for an LED outdoor lamp, which secures uniform light within an effective illumination range and reduces quantity of light shining outside of the illumination range, that is, allows stray light to be nearly eliminated, and also to the road lamp, security lamp, tunnel lamp, park lamp, guard lamp, industrial flood lamp, and outdoor lamp using the LED lens.

BACKGROUND OF THE DISCLOSURE

Conventionally, for lighting city streets, natrium lamps, mercury lamps, or metal halide lamps have been generally used. Such lamps require large electric consumption and have a short life. Also, they require high maintenance and repair costs and may cause environmental contamination. Therefore, it can be called a revolutionary change in the lighting field to replace the conventional lighting devices with LED lighting devices.

In general, in an outdoor lamp such as an LED road lamp, light is collected through a lens installed on an LED lamp cover. However, a light field obtained by projecting light through the conventional circular lens has a circular shape, and there is a big difference in brightness between the central part of the light field and the peripheral part thereof. Also, in real application, there are many cases where an illumination range has to be broad in a particular direction and has to be small in another direction.

For example, in a case of a street lighting where a road expands, it is desirable that an illumination range has to be broad along the road with a good lighting effect, and a lighting angle has to be wide in concert with the road extension. However, in the primary direction of the road, an illumination range is preferably small so as to prevent a waste of electricity and pollution of surroundings due to unwanted light. In a case of the conventional LED road lamps equipped with the circular lens, it is generally known that more road lamps must be installed where the road expands so as to secure sufficient lighting effect.

However, in that case, light fields are overlapped with each other so that brightness is higher, but the distribution of lighting intensity is not uniform. Therefore, the resultant light field formed on the road gives a stripe where bright and dark areas are repeatedly formed in turn so that the shape of the light field resembles the ribs. Due to such a lighting phenomenon, the area under lighting devices has high brightness, but other areas have low brightness so that the average brightness of the road is low and is not uniform. As a result, there is much probability that a driver sees an illusion while driving his/her car which can lead to a traffic accident, and also seriously influences safety in driving a vehicle.

Also, besides traffic roads, there is a problem that surroundings are polluted due to stray lights, and glare occurs in various outdoor/indoor environments.

DISCLOSURE OF THE INVENTION

One embodiment of the present invention provides a lens for an LED outdoor lamp, which has a superior effect regarding light concentration so that the lens is suitable for conditions regarding light distribution, brightness, and energy saving when the lens is used in the road lamps, security lamps, tunnel lamps, park lamps, guard lamps, industrial flood lamps, and outdoor lamps, the present invention also providing these lamps without glare and radiation lights, in which superior brightness and uniformity are secured, an illumination range is accurate, and energy can be remarkably saved.

Another embodiment provides a lens for an LED outdoor lamp, the lens including: a recess formed at a first side surface of the lens, the recess having a central part at which an LED can be installed and a wall surface, which is an incident surface; a light emitting surface formed at a second side surface of the lens, the light emitting surface being shaped like a pillow in such a manner that a central part has an arc-shape; and a perfect reflection surface formed at the first side surface of the lens, the perfect reflection surface surrounding the recess and reflecting light to the light emitting surface.

It is preferable that the recess has one shape selected from a hemispherical shape, a cylindrical shape, a cylindrical shape having an upper surface of a concave arc-shape, and a cylindrical shape having an upper surface of a convex arc-shape.

It is preferable that the lens is made from transparent material, such as polycarbonate (PC) or polymethyl methacrylate (PMMA).

Yet another embodiment provides a lighting device including: at least one illumination module; and a frame in which the illumination module is installed, wherein the illumination module includes a cooling part, a substrate having an LED matrix formed thereon so as to be attached onto a bottom surface of an upper part of the cooling part through a thermal conductive insulation pad, a PCB having a through-hole matrix so as to be installed at an upper part of the substrate and connected with each LED terminal on the substrate, and a lens cover having a lens matrix so as to be installed at an upper part of the PCB, wherein a recess, which allows an LED of the LED matrix to be installed in an interior of the recess and has a wall surface to be an incident surface, is formed on a central part of a first side surface of each lens of the lens matrix, a light emitting surface, which protrudes to have an arc-shape similar to a pillow, is formed at a central part of a second side surface, and a perfect reflection surface, which surrounds the recess and reflects light to the light emitting surface, is formed at the first surface of the lens, and wherein the LED passes through a corresponding PCB through-hole on the PCB so as to be installed within the corresponding recess.

It is preferable that a plurality of cooling fins is installed at the cooling part.

It is preferable that a side frame, which passes through a lens cover through-hole, is installed at a periphery of the lens cover, and the lens cover is installed at the cooling part in such a manner that a lens cover screw passes through the lens cover through-hole to be fixed in the cooling part.

It is preferable that a sealing ring is additionally installed between the side frame and the cooling part, a plurality of position fixing columns is installed at the side frame, and position fixing holes for fixing a position of the sealing ring is formed at a part of the sealing ring, which corresponds to the position fixing columns.

It is preferable that the frame is divided into at least one installation hole by a plurality of frameworks arranged in longitudinal and latitudinal directions while intersecting each other, the signal illumination module is installed within the installation hole, a installation strip having screw holes is formed at both sides of the cooling part of the illumination module, screw apertures corresponding to the screw holes are formed at each framework surrounding the installation hole, a main body of the illumination module is disposed within the installation hole, and the installation strip of the cooling part is arranged on the framework and is assembled with the screw holes and the screw apertures by strip screws so as to fix the illumination module in the framework.

It is preferable that the recess has one shape selected from a hemispherical shape, a cylindrical shape, a cylindrical shape having an upper surface of a concave arc-shape, and a cylindrical shape having an upper surface of a convex arc-shape.

It is preferable that the lens cover is made from transparent material, such as polycarbonate (PC) or polymethyl methacrylate (PMMA).

According to yet another embodiment of the invention, when the lens is used, a distribution curve of luminous intensity is shaped like a wing of a bat, and the section of the lens can be changed as needed. Therefore, distribution of light can be reasonably adjusted so as to form the shape of a light field of the lighting device into a square shape. Also, it is possible to increase radiation efficiency to more than 75% and increase a total projection rate to more than 90% so that loss of optical energy is reduced at the maximum degree and light emitted from an optical source can be used well.

Moreover, there is an advantage in that brightness within an available illumination range of the lighting device is very uniform, and the edge of the light field is clear so that stray light hardly exists outside of the available illumination range, and also glare doesn't occur, thereby preventing pollution of light. Therefore, the present disclosure provides energy-saving green purity lighting, which can be applied to illumination fields, such as road illumination, lighting for advertisements, etc., which require special conditions.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
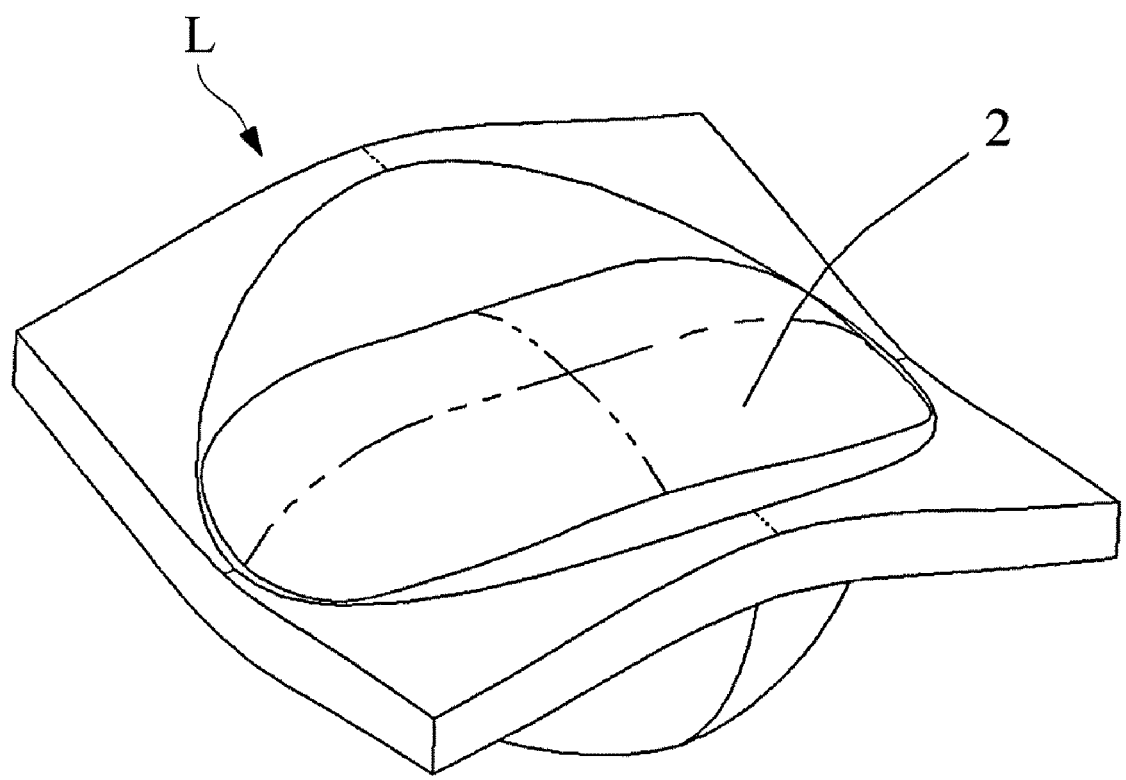
FIG. 1 is a perspective view of a lens for an LED outdoor lamp according to an embodiment of the present disclosure.

Hereinafter, an exemplary embodiment of the present disclosure will be described with reference to the accompanying drawings. In the following description, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

Figure 2:
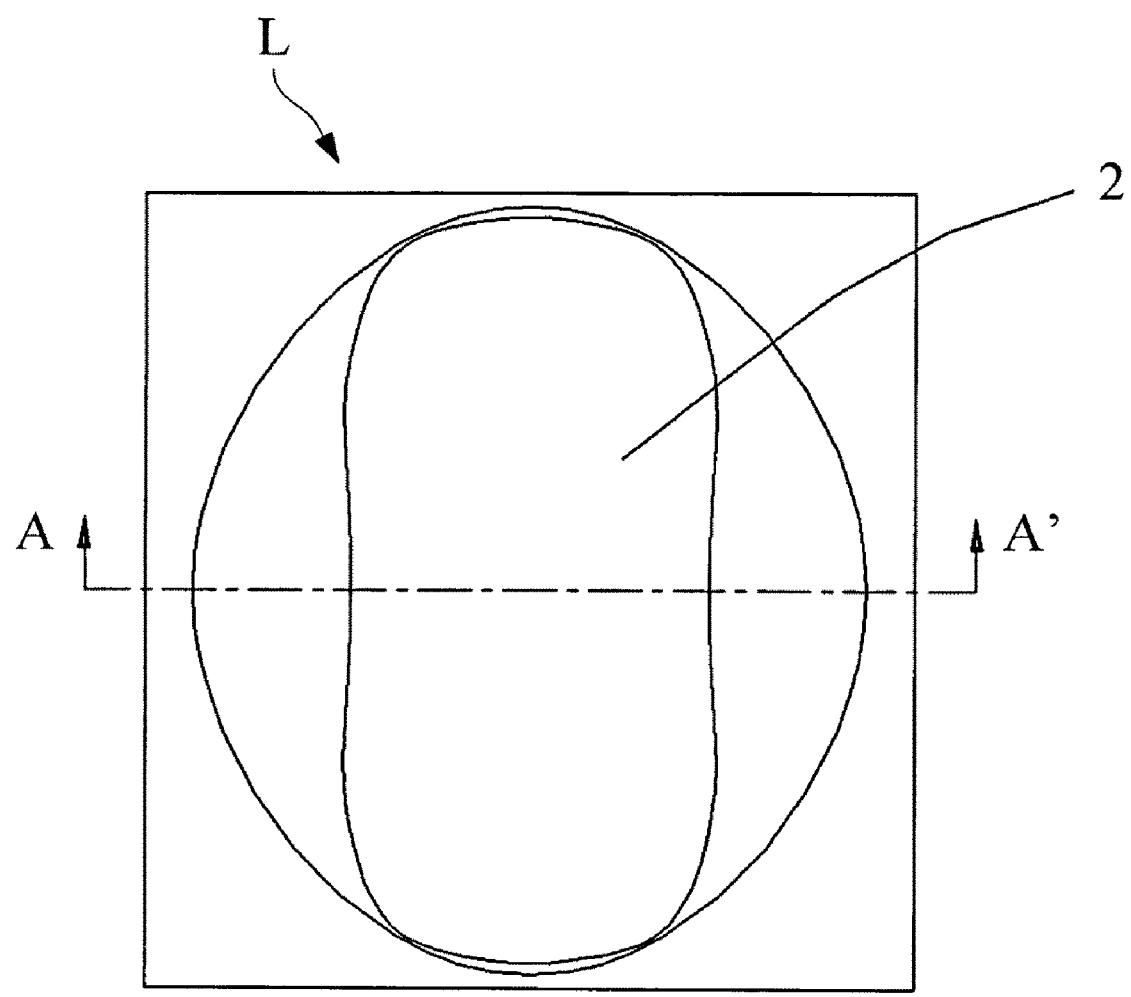
FIG. 2 is a plan view of a lens for an LED outdoor lamp according to an embodiment of the present disclosure.

FIG. 1 is a perspective view of a lens for an LED outdoor lamp according to a first embodiment of the present disclosure. FIG. 2 is a plan view of a lens for an LED Outdoor lamp according to the first embodiment of the present disclosure, and FIG. 3 shows an exemplary sectional view taken along line A-A' of FIG. 2.

Figure 3:
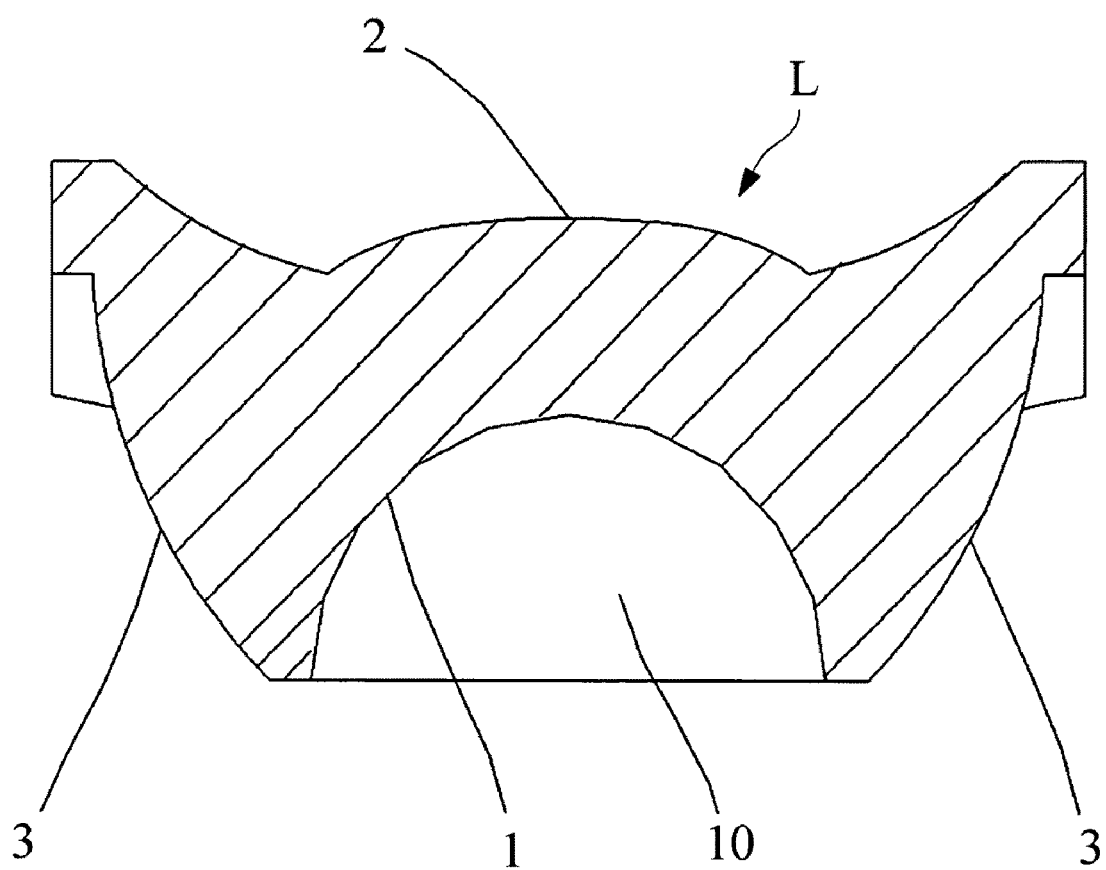
FIG. 3 shows an example of a sectional view taken along line A-A' of FIG. 2.

As shown in FIGS. 1 to 3, a recess 10 is formed at a central part of a first side surface of an the LED outdoor lamp lens L so as to allow an LED to be installed concentrically of the recess 10, the wall surface of which defines an incident surface 1. A light emitting surface 2, which is shaped like a pillow, is formed at a second side surface of the lens L in such a manner that a central part of the second side surface swells into the shape of an arc. The pillow shape is elongated and has two opposite ends, which are roughly arc surfaces. Each central portion of both lateral sides of the elongated shape is a little depressed inwardly with two top surfaces protruding into arcs. Also, a perfect reflection surface 3, which surrounds the recess 10 and reflects rays to the light emitting surface 2, is formed at the first side surface of the lens L. The lens L is preferably made from transparent material, such as polycarbonate (PC) having a superior translucent property or polymethyl methacrylate (PMMA).

Figure 4:
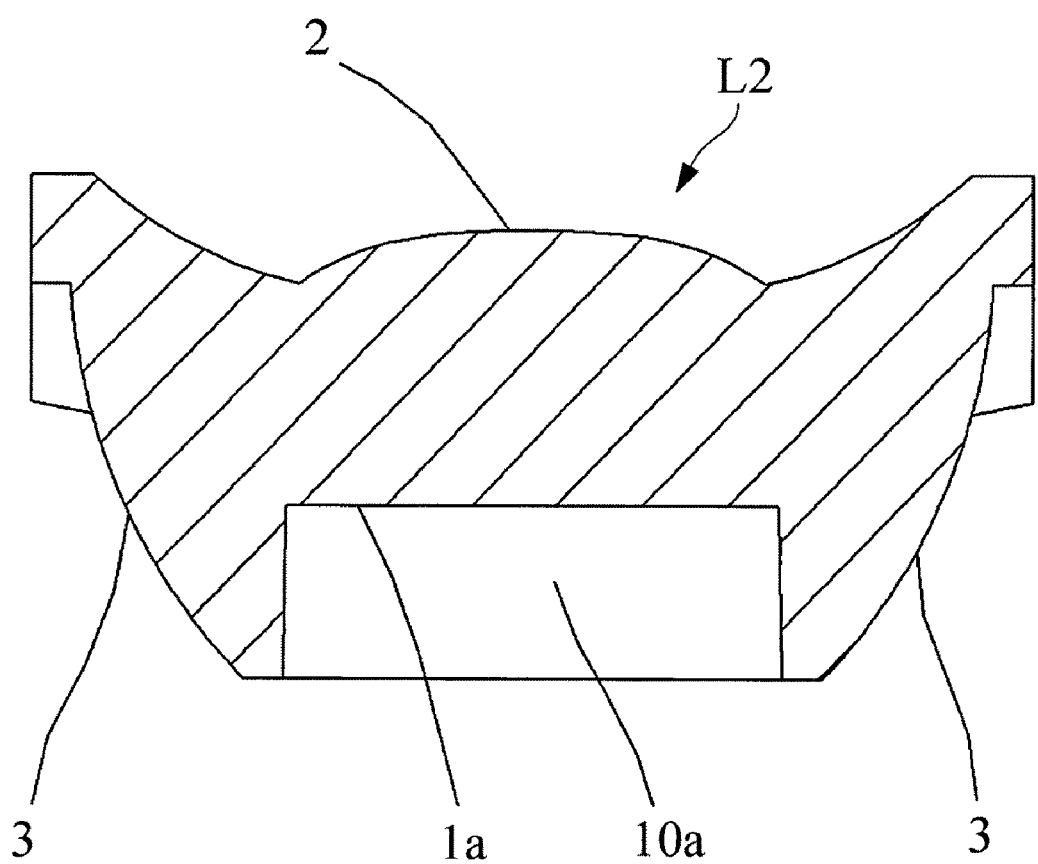
FIGS. 4 to 6 show other examples of a sectional view of a lens for an LED outdoor lamp according to an embodiment of the present disclosure.
Figure 5:
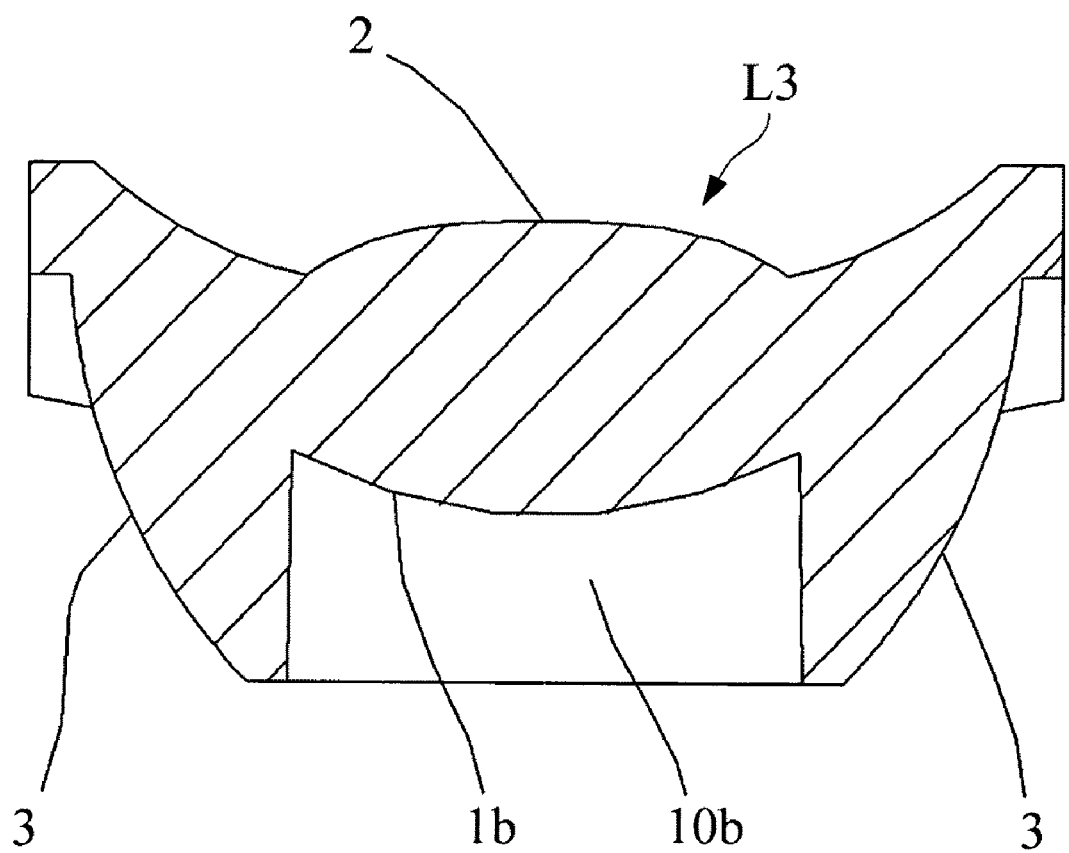
Figure 6:
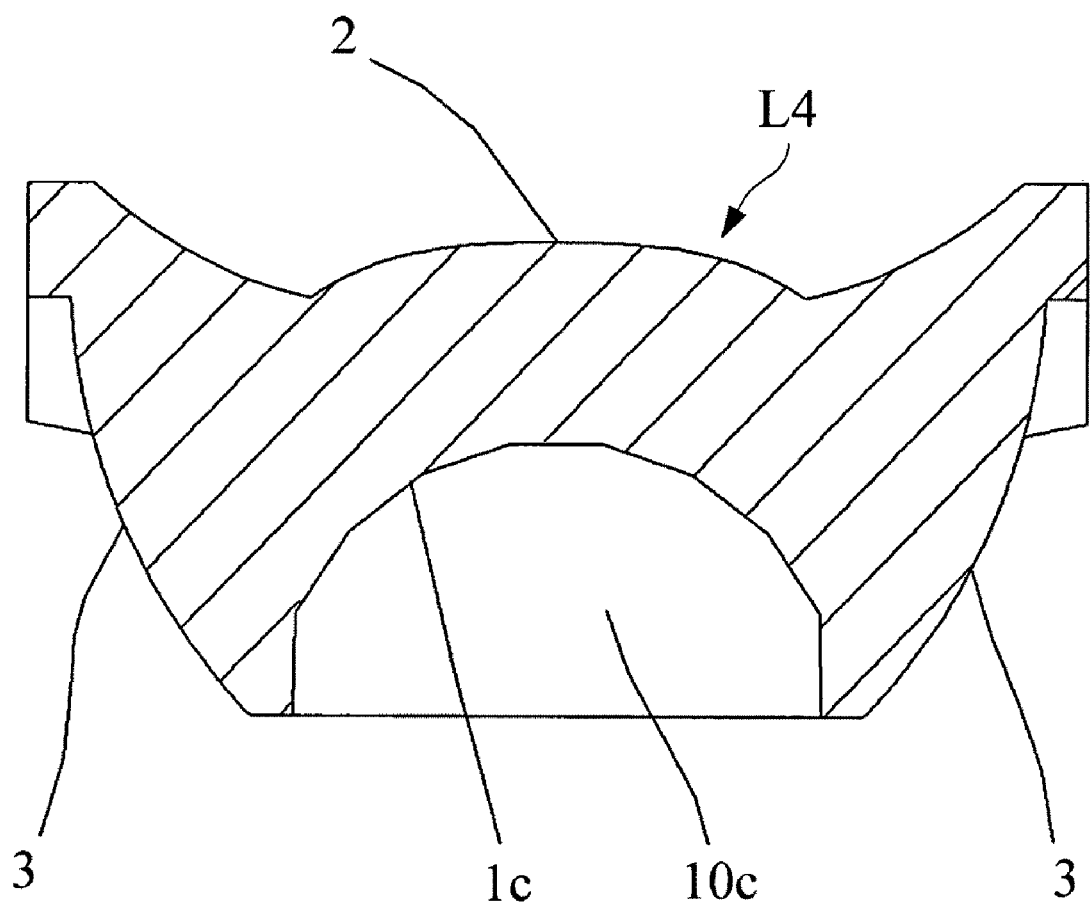

FIGS. 4 to 6 show other examples in sectional view of the lens L for LED outdoor lamp according to the embodiment of the present disclosure.

A comparison of a lens L2 of FIG. 4 with the lens L of FIG. 3 will be described below. An LED will be installed at a central part of recess 10 having a cylindrical shape. Light emitted towards the upper side of the cylindrically shaped recess 10 is refracted and is directly emitted through the light emitting surface 2 of the lens L. Also, light emitted towards side surfaces of the cylindrically shaped recess 10 may be emitted from the light emitting surface 2 of the lens L with a perfect reflection by the perfect reflection surface 3.

Also, based on a recess 10a of the lens L2, which has a cylindrical shape with a flat ceiling 1a, as shown in FIG. 4, it is possible to design the upper surface of the recess 10a into the respectively arc-shaped surfaces as shown in FIGS. 5 and 6. The arc-shaped surface can be an arc-shaped surface of a lens L3 curved downward (see FIG. 5 at 1b on a recess 10b) or an arc-shaped surface of a lens L4 curved upward (see FIG. 6 at 1c on a recess 10c). The recesses 10 and 10a-c having different shapes can be designed to be assembled with LEDs having different light distributions, respectively, so as not to affect beam condensation.

Figure 7:
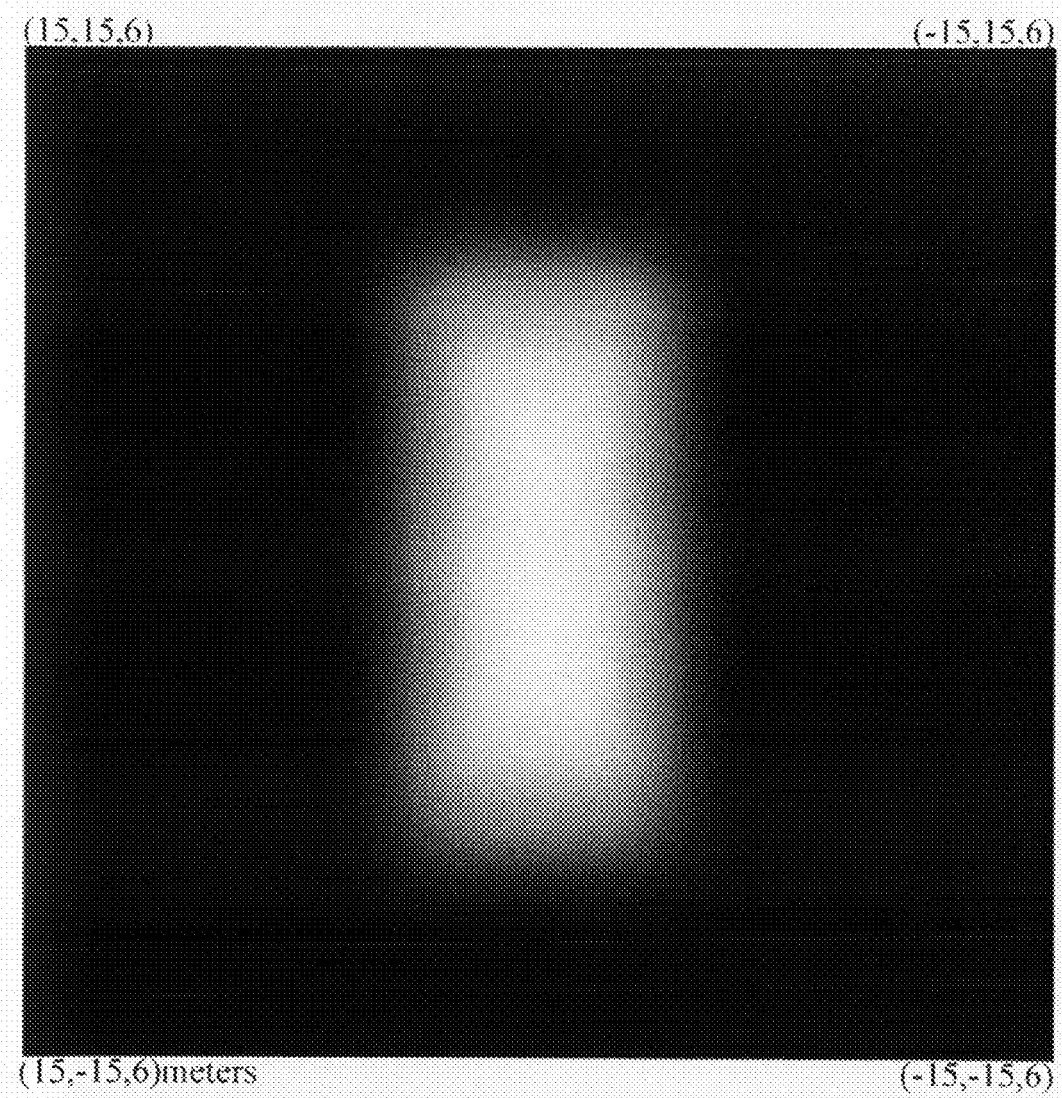
FIG. 7 is a view showing a light field in a case where an outdoor lamp using an LED outdoor lamp lens according to an embodiment of the present disclosure is positioned at the height of 6 m.

FIG. 7 is a view showing a light field in a case where an outdoor lamp using the LED outdoor lamp lens according to the embodiment of the present disclosure is positioned at the height of 6 m.

As shown in FIG. 7, the formed light field basically has a square shape and can effectively satisfy a lighting condition in both vertical directions (e.g. road lighting).

Figure 8:
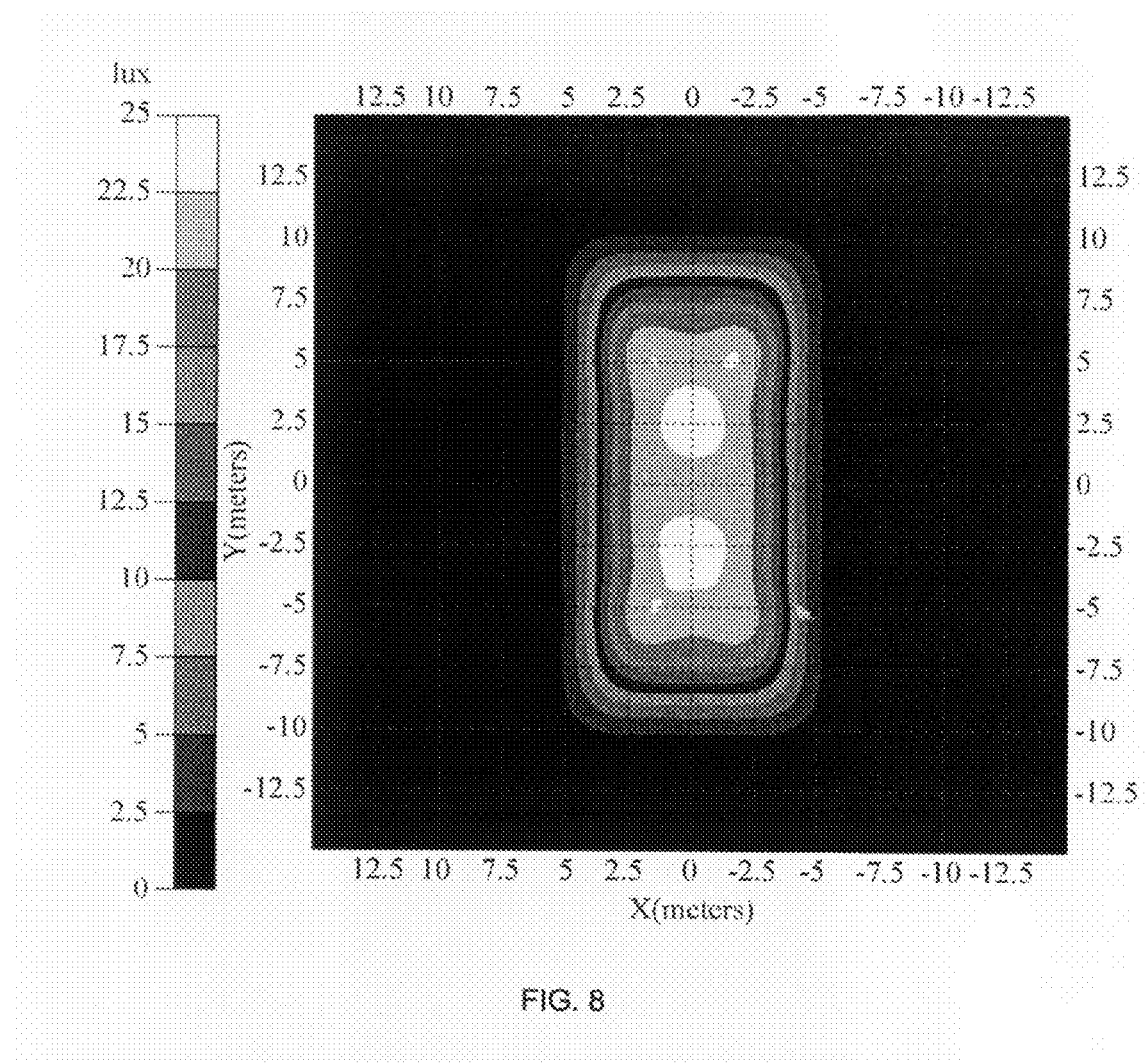
FIG. 8 is a view showing brightness distribution in a case where an outdoor lamp using an LED outdoor lamp lens according to an embodiment of the present disclosure is positioned at the height of 6 m.

FIG. 8 is a view showing brightness distribution in a case where an outdoor lamp using an LED outdoor lamp lens according to an embodiment of the present disclosure is positioned at the height of 6 m.

As shown in FIG. 8, a difference of brightness between a central part of the light field and a peripheral part thereof is comparatively small. That is, brightness uniformity is superior.

Although FIGS. 7 and 8 show a case of the height of the outdoor lamp being 6 m, the present disclosure is not so limited. The height of the outdoor lamp, a lighting distance, etc. for achieving a sufficient lighting effect can be varied. For example, a road lamp requires a height of more than 9 m, a security lamp requires a height of less than 9 m, and an effective lighting distance of a tunnel lamp, a park lamp, a guard lamp, or an industrial flood lamp using the lens of the embodiment may be different according to a desired position where each lamp is installed.

Figure 9:
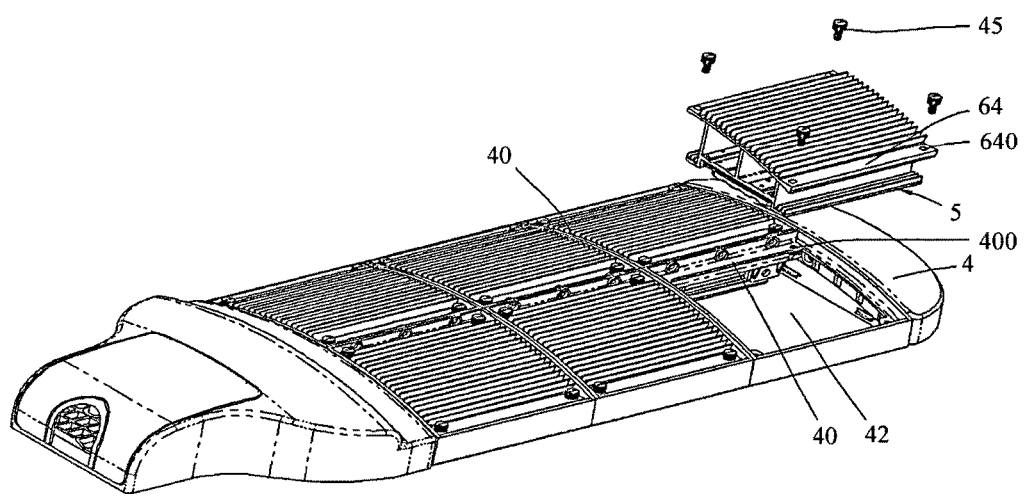
FIG. 9 is a view showing a lighting device according to an embodiment of the present disclosure.

FIG. 9 is a view showing a lighting device according to a second embodiment of the present disclosure.

Figure 10:
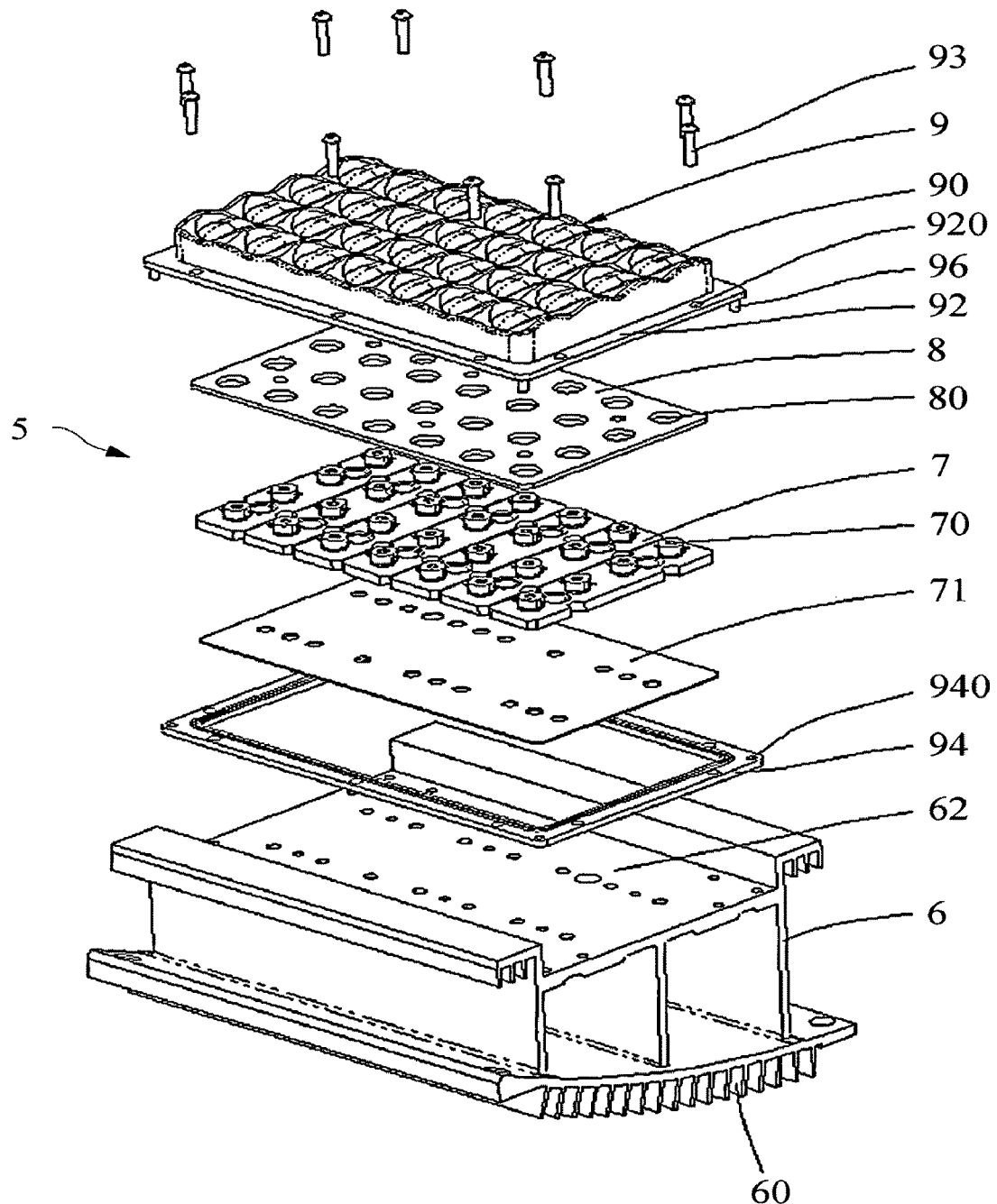
FIG. 10 is an exploded perspective view of a lighting module of a lighting device according to an embodiment of the present disclosure.
Figure 11:
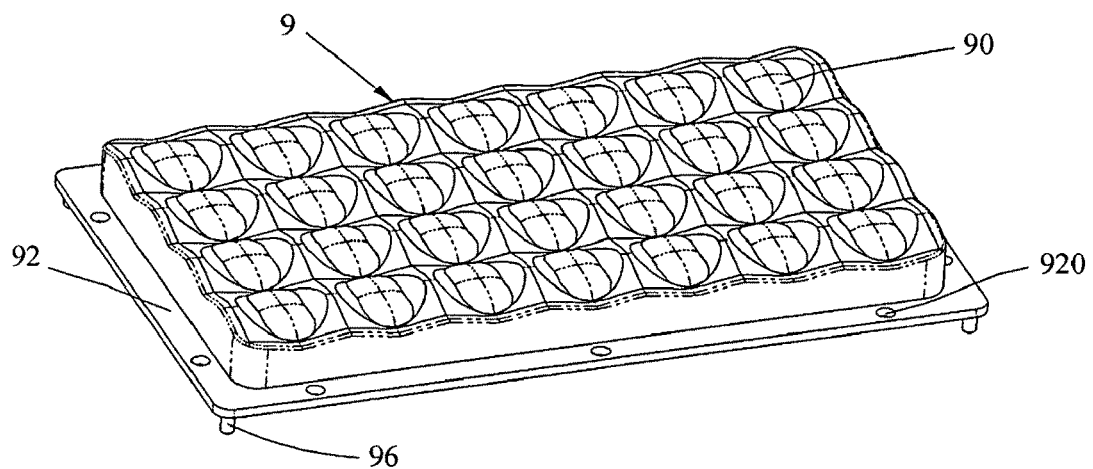
FIG. 11 is a perspective view of a lens cover of a lighting device according to an embodiment of the present disclosure.
Figure 12:
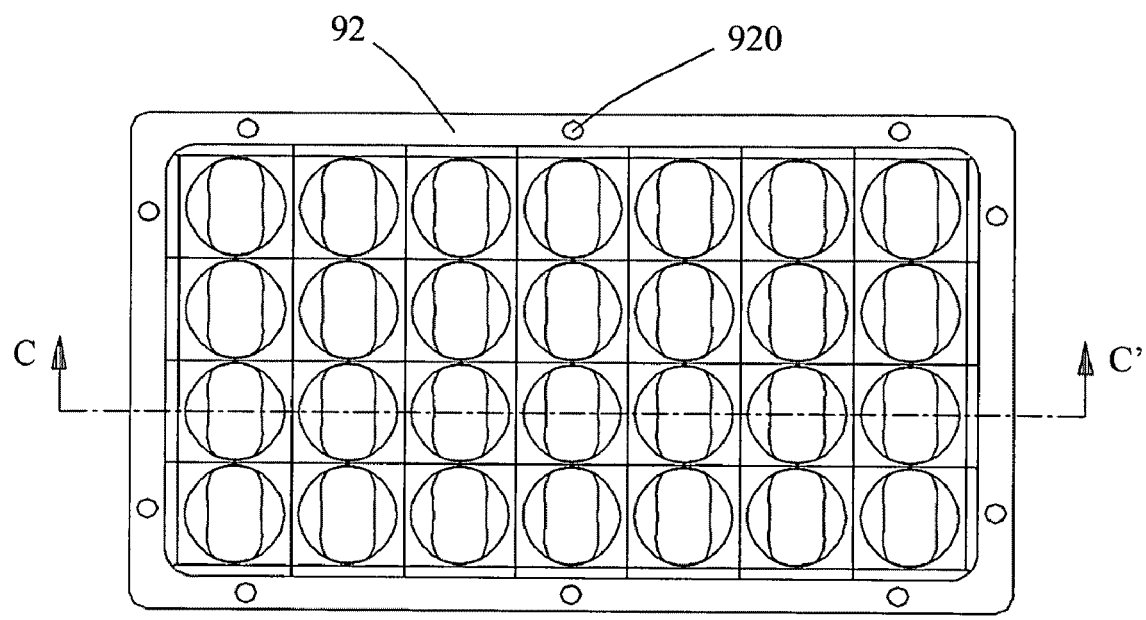
FIG. 12 is a plan view of a lens cover of a lighting device according to an embodiment of the present disclosure.
Figure 13:
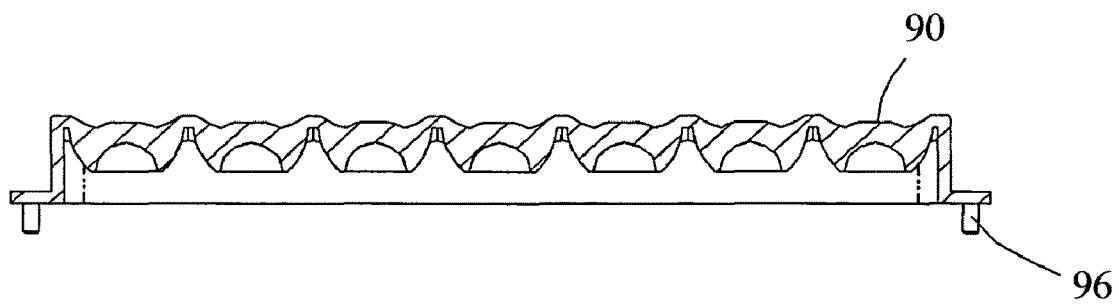
FIG. 13 is a view of a sectional view taken along line C-C' of FIG. 12.

FIG. 10 is an exploded perspective view of a light module of the lighting device according to the embodiment of the present disclosure, and FIG. 11 is a perspective view of a lens cover of the lighting device according to the embodiment of the present disclosure. FIG. 12 is a plan view of the lens cover of the lighting device according to the embodiment of the present disclosure, and FIG. 13 is a view of a sectional view taken along line C-C' of FIG. 12.

As shown in FIGS. 9 to 13, the lighting device according to the embodiment of the present disclosure includes at least one illumination module 5 and at least one frame 4 in which at least one illumination module 5 is installed.

Herein, the illumination module 5 includes a cooling part 6, a substrate 7 having an LED matrix, a printed circuit board or PCB 8, and a lens cover 9 having a lens matrix.

The substrate 7 is attached to a bottom surface of an upper part of the cooling part 6 through a thermal conductive insulation pad 71. The PCB 8 is installed at one side of the substrate 7, on which the LED matrix is disposed. A through-hole matrix formed by arranging a plurality of PCB through-holes 80 is included in the PCB 8. Each PCB through-hole 80 corresponds to each LED of the LED matrix one to one so as to allow each LED 70 of the LED matrix to pass through the corresponding PCB through-hole 80. The circuit of the PCB 8 is connected to each LED terminal. The structure of a single lens 90 in the lens matrix of the lens cover 9 is the same as that of the LED outdoor lamp lens according to the first embodiment of the present disclosure. Therefore, the description of that will be omitted.

A plurality of cooling fins 60 is installed in the cooling part 6. A recess 62 is formed on a bottom surface of an upper part of the cooling part 6. The substrate 7 is installed on a bottom of the recess 62 through the thermal conductive insulation pad 71. The PCB 8 is installed at an upper surface of the substrate 7. The lens cover 9 is installed at the upper part of the PCB 8. Each LED 70 on the substrate 7 passes through the corresponding PCB through-hole 80 of the PCB 8 and is positioned at the center of the recess of the respective lens 90 in the lens cover 9.

A side frame 92 having a lens cover opening 920 is installed at the periphery of the lens cover 9. The lens cover 9 is installed at the cooling part 6 by lens cover screws 93 driven through the lens cover through-holes 920 so as to be fixed in the cooling part 6. A sealing ring 94 is additionally installed between the side frame 92 of the lens cover 9 and the cooling part 6 so as to achieve an airtight water-proof effect and dust-proof effect, thereby protecting the internal circuit and LEDs. A plurality of position fixing columns 96 is installed at the side frame 92 of the lens cover 9. Position fixing holes 940, which allow the position fixing columns 96 to be inserted thereinto so as to fix the position of the sealing ring 94, are formed at the sealing ring 94 while corresponding to the location fixing columns 96.

The frame 4 is divided into a plurality of installation holes 42 by frameworks 40 arranged in longitudinal and latitudinal directions while intersecting each other, and one illumination module 5 is installed at the interior of each installing holes 42. As shown in the embodiment of FIG. 7, the frame 4 may be divided into six installation holes 42. Also, one illumination module 5 is arranged in the interior of the respective installation holes 42, and each illumination module can be individually operated. Such a structure can allow an installation work and a subsequent maintenance work to be conveniently and rapidly performed. Also, when a certain illumination module 5 is damaged, it is suffice to replace the illumination module 5 with a new module without a need for replacing the whole lighting device. Therefore, maintenance work can be very easily performed, and maintenance costs can be remarkably reduced. Also, when performing a replacement operation, other illumination modules 5 can normally perform an illuminating operation so that there is no adverse effect given to an illumination function of the lighting device.

An installation strip 64 having screw holes 640 is formed at both sides of the cooling part 6 of the illumination module 5, and screw apertures 400 corresponding to the screw holes are formed at each framework 40 surrounding the installation hole 42 of the frame 4. When assembling each illumination module, the main body of each illumination module 5 is installed at the interior of each installation hole 42, and the installation strip 64 of the cooling part 6 is installed on the framework 40. Also, the illumination module 5 is fixed in the framework 40 by strip screws 93 in such a manner that the strip screws are assembled with the screw holes 640 of the installation strip 64 of the cooling part 6 and the screw apertures 400 of the framework 40 of the frame 4.

Figure 14:
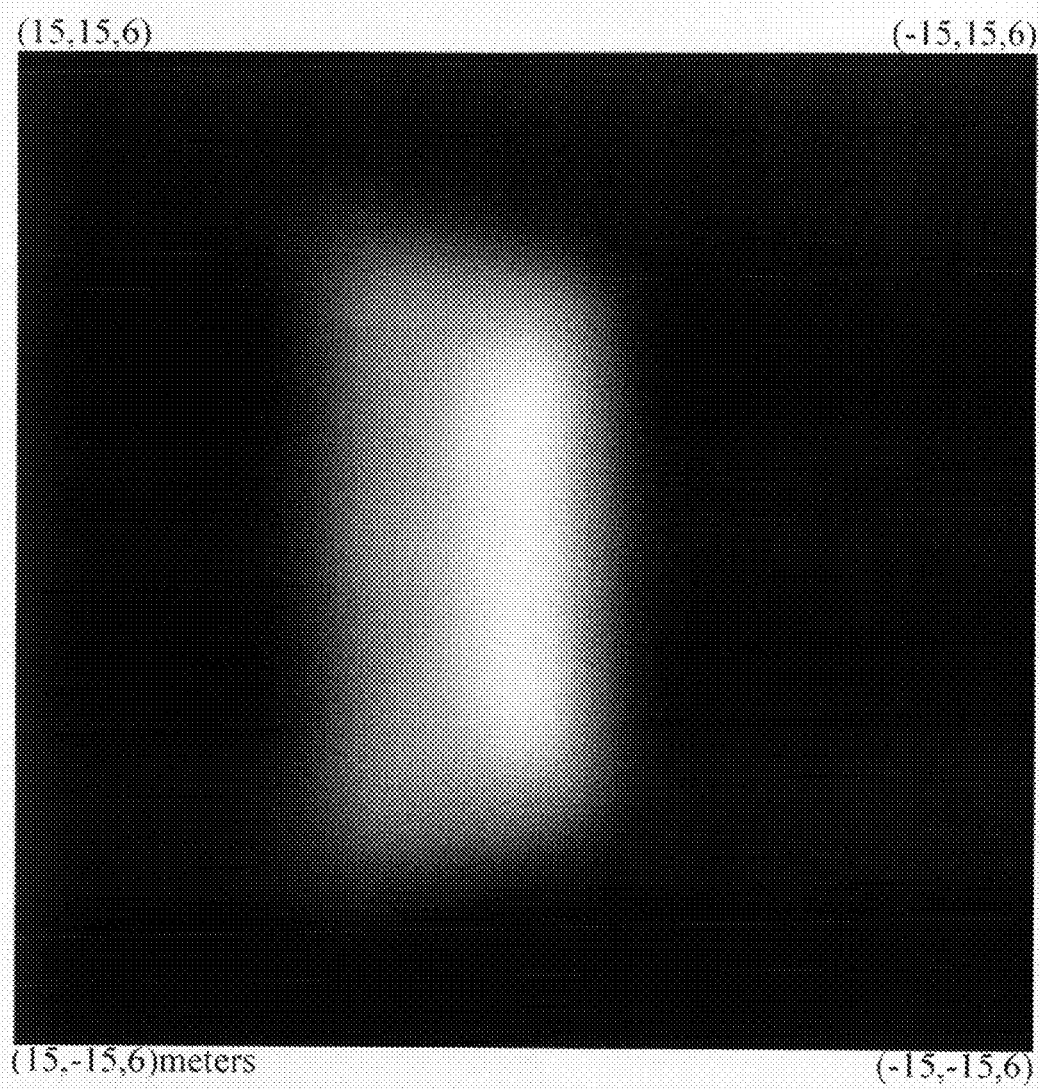
FIG. 14 shows a light field after light has been projected to a bottom surface from a lighting device according to an embodiment of the present disclosure in a case where the lighting device is positioned at the height of 6 m.

FIG. 14 shows a light field after light has been projected to a bottom surface from the lighting device according to the second embodiment of the present disclosure in a case where the lighting device is positioned with the height of 6 m.

As shown in FIG. 14, since a slant angle of 0~15 degrees is formed when a lighting device is installed, a light field, which is formed by projecting light to a ground surface by the lighting device, can be shaped similar to a trapezoid due to influence of the slant angle formed when the lighting device is installed.

Figure 15:
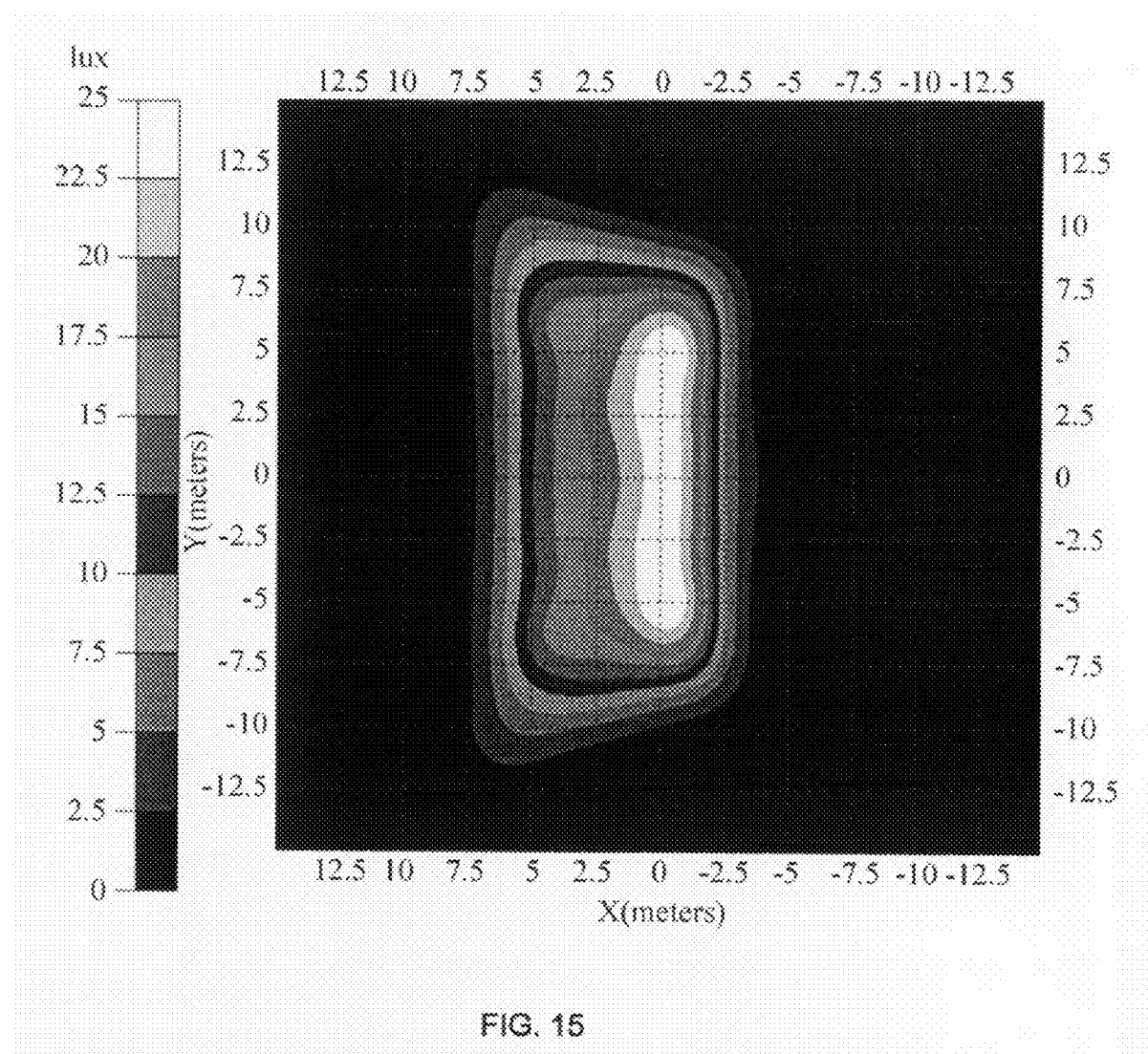
FIG. 15 shows brightness distribution after light is projected to a bottom surface from a lighting device according to an embodiment of the present disclosure in a case where the lighting device is positioned at the height of 6 m.

FIG. 15 shows brightness distribution after light is projected to a bottom surface from the lighting device according to the second embodiment of the present disclosure in a case where the lighting device is positioned with the height of 6 m.

As shown in FIG. 15, although the shape of the light field is influenced by the slant angle formed when the lighting device is installed, brightness distribution isn't basically influenced by the slant angle, and brightness distribution of an illumination area positioned just below the lighting device and brightness distribution of other illumination areas are comparatively uniform. Also, the fact that the brightness distribution of the illumination area positioned just below the light device is a little higher than that of other areas conforms to a necessary condition, e.g. a necessary condition that brightness of light emitting to a high speed lane has to be higher than brightness of light emitting to a low speed lane.

Although a case where the lighting device is positioned with the height of 6 m is shown in FIGS. 14 and 15, the present embodiment isn't thus limited. The height of the lighting device, a lighting distance thereof, etc. for achieving a sufficient lighting effect can be varied. As noted above, a road lamp requires a height of more than 9 m, a security lamp requires a height of less than 9 m, and each lighting distance of a tunnel lamp, a park lamp, a guard lamp, and an industrial flood lamp may be different according to a desired position where each lamp is installed.

The lighting devices according to the embodiments of the present disclosure, which are shown in FIGS. 1 to 15, can be equally applied to lighting devices including an outdoor lamp, a road lamp, a security lamp, a tunnel lamp, a park lamp, a guard lamp, an industrial flood lamp, etc.

That is, the lighting devices can be used in all spots requiring an illumination effect where brightness distribution of an area located just below the lighting device and brightness distribution of other areas are comparatively uniform, the edge of the light field is clear, stray light hardly exists outside of an available illumination range, and a glare should not occur.

According to the present disclosure, when the lens is used, a distribution curve of luminous intensity is shaped like a wing of a bat, and the cross sections of the lens can be changed as needed to reasonably adjust the distribution of light so as to form the shape of a light field of the lighting device into a square shape. Also, according to the present embodiments, it is possible to increase radiation efficiency to more than 75% and increase a total projection rate to more than 90% so that loss of optical energy is reduced at the maximum degree and light emitted from an optical source can be used well.

Moreover, there is an advantage in that brightness within an available illumination range of the lighting device is highly uniform, and the edge of the light field is clear so that stray light hardly exists outside of the available illumination range, and also glare doesn't occur, thereby preventing pollution of light. Therefore, the present disclosure provides energy-saving type green purity lighting, which can be applied to illumination fields, such as road illumination, advertisement, etc., which require special conditions.

Although exemplary embodiments of the present disclosure have been described for illustrative purposes, those skilled in the art will appreciate that various modifications, additions and substitutions are possible, without departing from the scope and spirit of the disclosure. Therefore, exemplary embodiments of the present disclosure have not been described for limiting purposes. Accordingly, the scope of the disclosure is not to be limited by the above embodiments but by the claims and the equivalents thereof.

What is claimed is:

1. A lighting device comprising:
at least one illumination module; and
a frame in which the illumination module is installed, wherein the illumination module includes a cooling part, a substrate having an LED matrix formed thereon so as to be attached onto a bottom surface of an upper part of the cooling part through a thermal conductive insulation pad, a PCB having a through-hole matrix so as to be installed at an upper part of the substrate and connected with each LED terminal on the substrate, and a lens cover having a lens matrix so as to be installed at an upper part of the PCB;
wherein a recess, which allows an LED of the LED matrix to be installed in an interior of the recess and has a wall surface to be an incident surface, is formed on a central part of a first side surface of each lens of the lens matrix, a light emitting surface, which protrudes to have an arc-shape similar to a pillow, is formed at a central part of a second side surface, and a perfect reflection surface, which surrounds the recess and reflects light to the light emitting surface, is formed at the first surface of the lens; and
wherein the LED passes through a corresponding PCB through-hole on the PCB so as to be installed within the corresponding recess;
wherein a plurality of cooling fins is installed at the cooling part; and
wherein the frame is divided into at least one installation hole by a plurality of frameworks arranged in longitudinal and latitudinal directions while intersecting each other, the signal illumination module is installed within the installation hole, a installation strip having screw holes is formed at both sides of the cooling part of the illumination module, screw apertures corresponding to the screw holes are formed at each framework surrounding the installation hole, a main body of the illumination module is disposed within the installation hole, and the installation strip of the cooling part is arranged on the framework and is assembled with the screw holes and the screw apertures by strip screws so as to fix the illumination module in the framework.

2. A lighting device comprising:
at least one illumination module; and
a frame in which the illumination module is installed, wherein the illumination module includes a cooling part, a substrate having an LED matrix formed thereon so as to be attached onto a bottom surface of an upper part of the cooling part through a thermal conductive insulation pad, a PCB having a through-hole matrix so as to be installed at an upper part of the substrate and connected with each LED terminal on the substrate, and a lens cover having a lens matrix so as to be installed at an upper part of the PCB;
wherein a recess, which allows an LED of the LED matrix to be installed in an interior of the recess and has a wall surface to be an incident surface, is formed on a central part of a first side surface of each lens of the lens matrix, a light emitting surface, which protrudes to have an arc-shape similar to a pillow, is formed at a central part of a second side surface, and a perfect reflection surface, which surrounds the recess and reflects light to the light emitting surface, is formed at the first surface of the lens; and wherein the LED passes through a corresponding PCB through-hole on the PCB so as to be installed within the corresponding recess;

wherein a plurality of cooling fins is installed at the cooling part; and wherein a side frame, which passes through a lens cover through-hole, is installed at a periphery of the lens cover, and the lens cover is installed at the cooling part in such a manner that a lens cover screw passes through the lens cover through-hole to be fixed in the cooling part.

3. The lighting device as claimed in claim 2, wherein a sealing ring is additionally installed between the side frame and the cooling part, a plurality of position fixing columns is installed at the side frame, and position fixing holes for fixing a position of the sealing ring is formed at a part of the sealing ring, which corresponds to the position fixing columns.

4. A lighting device comprising:
at least one illumination module; and
a frame in which the illumination module is installed, wherein the illumination module includes a cooling part, a substrate having an LED matrix formed thereon so as to be attached onto a bottom surface of an upper part of the cooling part through a thermal conductive insulation pad, a PCB having a through-hole matrix so as to be installed at an upper part of the substrate and connected with each LED terminal on the substrate, and a lens cover having a lens matrix so as to be installed at an upper part of the PCB, wherein a recess, which allows an LED of the LED matrix to be installed in an interior of the recess and has a wall surface to be an incident surface, is formed on a central part of a first side surface of each lens of the lens matrix, a light emitting surface, which protrudes to have an arc-shape similar to a pillow, is formed at a central part of a second side surface, and a perfect reflection surface, which surrounds the recess and reflects light to the light emitting surface, is formed at the first surface of the lens, and wherein the LED passes through a corresponding PCB through-hole on the PCB so as to be installed within the corresponding recess.

5. The lighting device as claimed in claim 4, wherein a plurality of cooling fins is installed at the cooling part.

6. The lighting device as claimed in claim 4, wherein a side frame, which passes through a lens cover through-hole, is installed at a periphery of the lens cover, and the lens cover is installed at the cooling part in such a manner that a lens cover screw passes through the lens cover through-hole to be fixed in the cooling part.

7. The lighting device as claimed in claim 6, wherein a sealing ring is additionally installed between the side frame and the cooling part, a plurality of position fixing columns is installed at the side frame, and position fixing holes for fixing a position of the sealing ring is formed at a part of the sealing ring, which corresponds to the position fixing columns.

8. The lighting device as claimed in claim 4, wherein the frame is divided into at least one installation hole by a plurality of frameworks arranged in longitudinal and latitudinal directions while intersecting each other, the signal illumination module is installed within the installation hole, a installation strip having screw holes is formed at both sides of the cooling part of the illumination module, screw apertures corresponding to the screw holes are formed at each framework surrounding the installation hole, a main body of the illumination module is disposed within the installation hole, and the installation strip of the cooling part is arranged on the framework and is assembled with the screw holes and the screw apertures by strip screws so as to fix the illumination module in the framework.

9. The lighting device as claimed in claim 4, wherein the recess has one shape selected from a hemispherical shape, a cylindrical shape, a cylindrical shape having an upper surface of a concave arc-shape, and a cylindrical shape having an upper surface of a convex arc-shape.

10. The lighting device as claimed in claim 4, wherein the lens cover is made from transparent material, such as polycarbonate (PC) or polymethyl methacrylate (PMMA).

11. The lighting device as claimed in claim 4, wherein the lighting device may be one of an outdoor lamp, a road lamp, a security lamp, a tunnel lamp, a park lamp, a guard lamp, and an industrial flood lamp.

* * * * *